United States Patent
Buckham et al.

(10) Patent No.: US 6,662,016 B1
(45) Date of Patent: Dec. 9, 2003

(54) PROVIDING GRAPHICAL LOCATION INFORMATION FOR MOBILE RESOURCES USING A DATA-ENABLED NETWORK

(75) Inventors: Kevin Buckham, Victoria (CA); Tony Melli, Victoria (CA); James Fitch, Edmonds, WA (US)

(73) Assignee: OpenWave Systems, Inc., Redwood City, CA (US)

( * ) Notice: Subject to any disclaimer, the term of this patent is extended or adjusted under 35 U.S.C. 154(b) by 0 days.

(21) Appl. No.: 09/565,761

(22) Filed: May 5, 2000

(51) Int. Cl.[7] .................................................. H04Q 7/20
(52) U.S. Cl. ..................... 455/457; 455/456.1; 701/211
(58) Field of Search .............................. 455/457, 456, 455/456.1; 701/208–213

(56) References Cited

U.S. PATENT DOCUMENTS

| | | | |
|---|---|---|---|
| 5,093,669 A | * 3/1992 | Kajiyama | 342/457 |
| 5,596,500 A | 1/1997 | Sprague et al. | 364/449.7 |
| 5,819,199 A | 10/1998 | Kawai et al. | 701/200 |
| 5,959,577 A | * 9/1999 | Fan et al. | 342/357.13 |
| 6,016,606 A | 1/2000 | Oliver et al. | 33/1 |
| 6,131,067 A | 10/2000 | Girerd et al. | 701/213 |
| 6,321,158 B1 | * 11/2001 | DeLorme et al. | 701/201 |

* cited by examiner

Primary Examiner—Vivian Chin
Assistant Examiner—Tuan Tran
(74) Attorney, Agent, or Firm—Marsh, Fischmann & Breyfogle LLP

(57) ABSTRACT

The inventive system relates to applications for providing graphical display information regarding mobile resources. In the illustrated embodiment, the system (100) provides graphical location information regarding one or more mobile resources (110, 120 and/or 130). The graphical location information is provided via a display (147) associated with a client platform (140). The display includes mapping information and mobile resource marker information transmitted from a server (170) to the client platform (140) via the Internet (180). The mapping information and marker information are provided in separate message sets thereby providing certain processing advantages.

5 Claims, 4 Drawing Sheets

PROVIDING GRAPHICAL LOCATION INFORMATION FOR MOBILE RESOURCES USING A DATA-ENABLED NETWORK

FIELD OF THE INVENTION

The present invention relates in general to providing location information for mobile resources and, in particular, to a system for combining data and wireless communications network assets for improved availability and delivery of graphical display information identifying one or more locations of mobile resources.

BACKGROUND OF THE INVENTION

In a variety of contexts, it is useful to provide information regarding the position of mobile resources. Such resource locations may include, for example: the location of an individual (including one's self); a car, truck, boat or other vehicle; one or more vehicles of a fleet; and/or the location of a mobile unit such as a wireless telephone. Applications that make use of such location information include fleet management applications, applications for providing driving or walking instructions and applications for tracking moving vehicles.

In such applications, it is sometimes desirable to provide location information by way of a graphical display. Such a display may show the location of a mobile resource on a map of a surrounding area. The map may identify other requested location information, such as the location of a service provider of interest, for example, a hotel, restaurant or the like, in addition to the mobile resource location. Such graphical displays are useful because they allow a viewer to quickly ascertain a significant amount of location information. For example, a dispatcher or fleet manager may quickly ascertain the location of mobile resources of interest by viewing the display. Similarly, an individual may quickly determine how to drive or walk to an identified service provider location by viewing a map that identifies both the location of the individual and the service provider location. Accordingly, it is useful to provide a display that includes at least mapping information and a marker, e.g., a cursor or other identifier, indicating the position of a mobile resource.

A number of systems have been implemented or proposed for providing map displays with mobile resource location markers. These include vehicle resident navigation systems and embedded location map servers. Vehicle resident navigation systems generally include an on-board satellite transceiver for location determination based on communication with satellites of a satellite constellation, e.g., a GPS transceiver, and an on-board computer for accessing stored mapping data. The satellite transceiver is generally capable of providing information sufficient to determine the coordinates of the vehicle as well as travel direction and speed. In this regard, the transceiver may provide raw data such as ranging/timing information that is processed by the on-board computer to obtain the coordinate and other processed information, or the processed information may be directly provided by the satellite transceiver.

Such systems have proved effective for various applications including providing driving instructions. However, such applications generally do not provide information for remotely monitoring vehicle location. In addition, such applications are generally limited to stored mapping information that may become outdated. Moreover, such systems generally require a dedicated satellite-based location finding transceiver that involves significant expense and on-board computing resources, as well as limiting system availability.

Embedded location map servers generate maps with embedded markers indicating the location of mobile resources, and make the resulting marker embedded maps available over a wide area network such as the Internet. In one such system, the mobile resources of interest are each provided with an on-board, satellite-based location finding system such as a GPS transceiver. Raw location data is transmitted across an air interface from the mobile resource to a central server of the wide area network. The server uses the raw location data to compute processed location data for the mobile resource, accesses stored mapping data and generates a map display with embedded marker information. This embedded marker mapping information is then made available over the wide area network such that a client can download a map with an embedded marker identifying the location of a mobile resource of interest. Although the system makes graphical location information available over a wide area network, it is still limited to use in connection with mobile resources with satellite-based location finding systems. Moreover, the provision of marker embedded mapping information imposes certain operational constraints.

SUMMARY OF THE INVENTION

The present invention is directed to a method and apparatus for improved availability and delivery of graphical location information regarding mobile resources. The invention allows for client side correlation of mapping data and marker data for enhanced processing options. In addition, the invention allows for provisioning of graphical location information for mobile resources without fully integrated satellite-based location equipment, e.g., mobile resources located using wireless network location finding technologies and other network assisted location technologies. The invention also enables provisioning of graphical position information to wireless terminals and otherwise facilitates operation in accordance with various network protocols.

In accordance with one aspect of the present invention, a method is provided for correlating mapping information and mobile resource marker information on a client side of a data-enabled network interface. The data enabled network, which may involve a wide area network such as the Internet and/or a data-enabled wireless network, includes a server node and a client node. The method includes the steps of: receiving location information regarding a mobile resource location; accessing, at the server node, mapping information for a geographical area including the mobile resource location; generating marker information defining a graphical representation of the mobile resource location; transmitting, from the server node to the client node, a first message set including the mapping information; and combining, at the client node, the mapping information and the marker information to generate a graphical display including the mobile resource location. Marker information may be transmitted form the server node to a client node in a second message set.

By separately providing the mapping information and marker information, rather than transmitting combined mapping and marker information across the network interface, and combining such information at the client node, the invention allows for certain processing advantages. For example, in the case of providing periodic updates of a mobile resource location where a given set of mapping data may be applicable to multiple updates, the invention avoids the necessity of resending certain mapping data. That is, only the marker updates may be transmitted across the network so long as the mobile resource remains within the bounds of the previously transmitted mapping data. This is particularly advantageous in environments where bandwidth and processing resources are limited such as networks including an air interface and applications involving thin clients such as Personal Digital Assistants (PDAs), or Cellular Digital Packet Data (CDPD) enabled wireless telephones/terminals or other terminals with limited processing resources. Relatedly, the mapping information and marker information can be transmitted at different times or via different paths for improved processing options or to better utilize available bandwidth.

An associated client apparatus includes a network interface for receiving the mapping information and marker information, logic for correlating the marker information to the mapping information and generating composite display information reflecting the mapping information and marker information, and a display for displaying the composite display information. For example, the client apparatus may include a processor running: 1) a browser or microbrowser running a Java applet to request the mapping information and marker information, and 2) a local mapping application for producing a map image and plotting the marker at the appropriate location on the map image.

According to another aspect of the present invention, graphical display information is provided regarding mobile resources that do not include fully integrated satellite-based location systems. For example, the location information for a mobile resource of interest may be provided by a wireless network assisted system such as a cell, cell sector or microcell location technology; a time difference of arrival (TDOA), angle of arrival (AOA) or other network triangulation technology; or a network assisted GPS technology. The associated method includes the steps of: providing a processing platform for receiving marker information regarding a mobile resource location; accessing mapping information for an area including the mobile resource location and generating graphical display information based on the mapping information and marker information; providing a link between the platform and a network assisted location finding system, the network assisted location finding system being operative for determining network location information regarding a mobile resource within an area of the network based at least in part on a relationship between a location of the mobile resource unit and a known location of a network structure in the noted area of the network; receiving, via the link, the network location information for the mobile resource; and operating logic running on the platform to generate a display based on the network location information. By virtue of the invention, graphical location information can be provided even for mobile resources that do not include a fully integrated satellite based location finding system. Accordingly, graphical location information can be provided for more mobile resources, at less cost and without requiring significant mobile unit computing resources dedicated to location finding.

According to another aspect of the invention, a method is provided for provisioning graphical location data to wireless data network enabled units. For example, graphical location information may be provided to a wireless phone, PDA or other wireless terminal. The method includes the steps of: providing a platform selectively interconnected to a first wireless unit via an air interface; obtaining location information regarding the same and/or a different wireless unit; accessing mapping information for a geographical area including the located wireless unit based on the location information; transmitting at least the mapping information from the platform to the first wireless unit; and displaying a composite display based on the mapping information and the location information on a display device associated with the first wireless unit. The nature of the display, including the richness and detail of the graphics, may vary depending, for example, on limitations of the display device and bandwidth and protocol limitations. Moreover, in accordance with this aspect of the present invention, the location information may be correlated to the mapping information at the platform or at the first wireless unit.

BRIEF DESCRIPTION OF THE DRAWINGS

For a more complete understanding of the present invention and further advantages thereof, reference is now made to the following detailed description taken in conjunction with the drawings in which.

DETAILED DESCRIPTION

Figure 1:
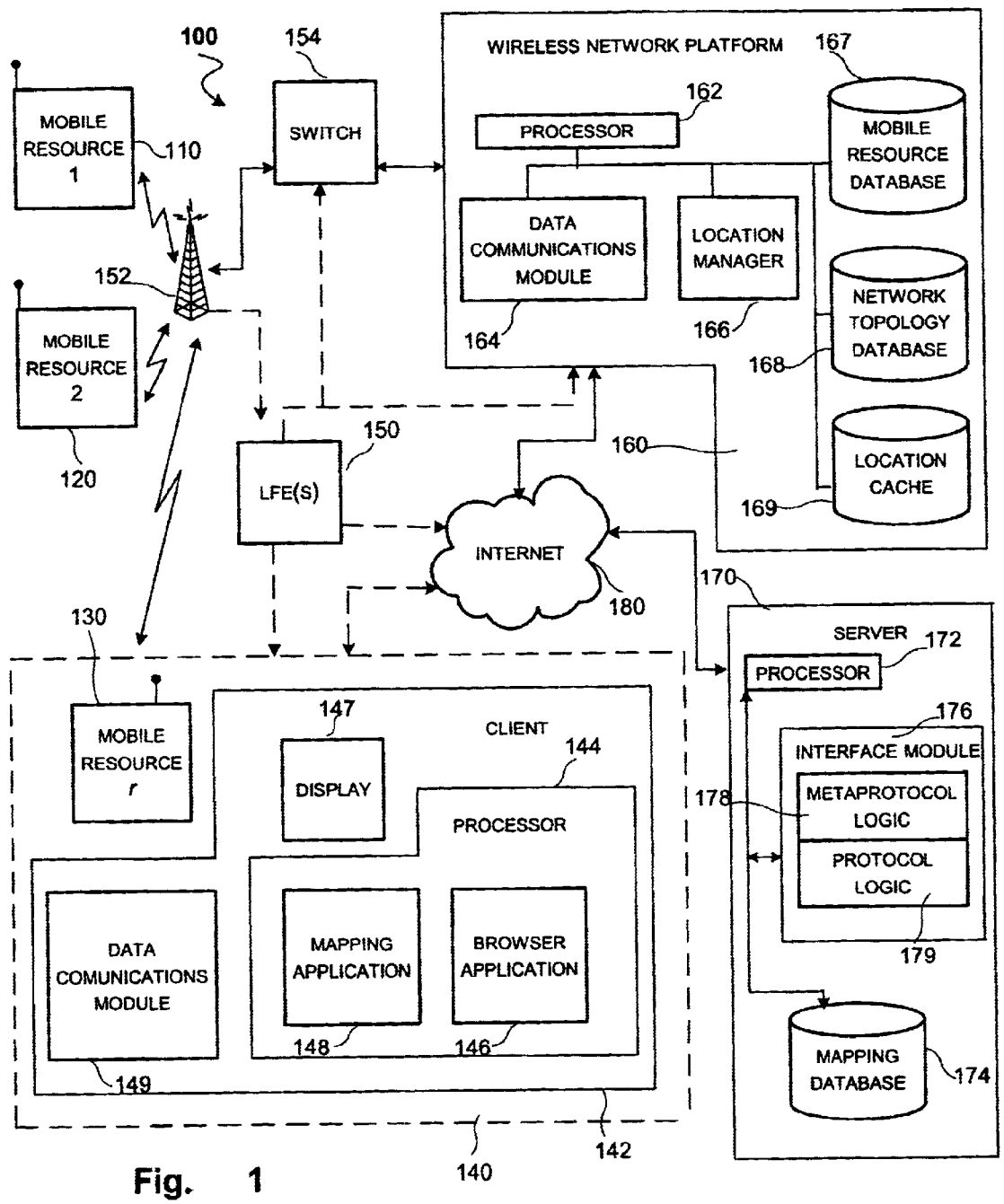
FIG. 1 is a schematic diagram of a graphical location information system in accordance with the present invention.

The present invention relates to applications for providing graphical display information regarding mobile resources. In general, such applications provide images where the location of one or more mobile resources is depicted on the map image. Many such applications have been proposed or are otherwise possible. The following provides a number of examples that illustrate various operating environments for the graphical location system of the present invention.

One general category of such applications is fleet monitoring or fleet management. In these applications, the locations of multiple mobile resources are monitored from a remote station. For example, rental car company may wish to monitor the movement of rental cars in order to verify that the cars do not cross national or regional boundaries in violation of a rental agreement. A dispatcher or other fleet manager may wish to monitor the location of trucks, taxis, couriers, delivery personnel or other fleet resources for improved operating efficiency. In yet another fleet monitoring application, an official or other observer may wish to monitor the location of yachts or other vehicles during a race.

Many other fleet monitoring or fleet management applications are possible. In such applications, the remote station may be utilized to monitor all identified mobile resources of a fleet, to locate a particular resource of a fleet, to locate all mobile resources within or outside of a specified area, to identify a closest resource to a particular location, to provide a notification when a mobile resource crosses a defined boundary, or for a variety of other purposes.

Another category of graphical location applications is mobile resource tracking. For example, law enforcement officials may desire to track a stolen vehicle or to monitor the location of parolees or other persons of interest. Similarly, parents may wish to monitor the movements of children. In such applications, like the fleet management applications described above, the mobile resources are typically monitored from a remote terminal. It will be appreciated that depending upon the application, the required location information, e.g., the required accuracy and the need for bearing, speed or other information, may vary.

Another type of graphical location application relates to locating local services. For example, a traveler using a vehicle-based system or wireless phone-based system may desire to locate local services such as a hotel, restaurant, bank or the like. In this regard, the traveler may wish to view a map showing the closest service provider, all service providers in a given area, service providers meeting certain user preferences, etc. An associated graphical location information application can provide appropriate images directly to the traveler.

Other types of graphical location applications include driving or walking instruction applications and emergency alert applications. For example, in a vehicle-based system, a user may request driving instructions from the user's current location to a desired location. Similarly, a user with a wireless telephone or other wireless terminal may request walking instructions from the user's current location to a desired location. In either case, the requested instructions may be provided in conjunction with a map image including markers identifying the current location and the desired location. An emergency alert application may provide information regarding local traffic, weather or other conditions of interest. Delivery of such information may be prompted in response to a request for information by the user or automatically upon identifying users within or crossing into an area of interest. The usefulness of such information may be enhanced by providing related map images.

Another example of graphical location applications are customer service applications such as call history information. For example, a wireless carrier may desire to make call history information available via a website. Thus, a network subscriber may go to the website, enter a user identification and other security information as required, and review a history of calls charged to the subscriber's account. Such information may be of particular interest where the subscriber's calling plan applies different rates depending the locations from which or to which the calls were placed. The website may provide images showing the location of calls (calling and/or called location) and, optionally, the locations of various billing zones. It will be appreciated that, in this application, the marker information associated with the calls and the rating zones is time delayed and is generally provided upon the request of the subscriber.

The above examples of graphical location applications are not intended to be exhaustive, but rather to illustrate a variety operating environments for the present invention. In this regard, the following variations are noted. First, the client device or display terminal may be associated with the located mobile resource or a remote monitoring station. Second, the marker information identifying a location of a mobile resource may be provided based on periodic updates, upon the occurrence of a specified event, upon request, based on proximity to an identified location or based on other criteria. In addition, the nature of the client device and the nature of the associated communications network may vary from application to application. Moreover, the map images may be provided in substantially real time or may be time delayed. Finally, the map information and marker information may be interdependent or independent. In the case where the map information and marker information are interdependent, the selected map information may determine the marker information, the location of the marker may determine the required map information, or multiple markers may determine the required map information.

FIG. 1 illustrates a graphical location information system 100 in accordance with the present invention for implementing a graphical location information application such as any of the applications described above. The illustrated system 100 may be used to provide graphical location information regarding one or more mobile resources 110, 120 and/or 130. The graphical location information is provided via a client platform 140 which may be associated with one of the mobile resources 110, 120 or 130, or may be provided at a remote location. The illustrated system 100 also includes a wireless network platform 160 and a wide area network or Internet server 170. The wireless network platform 160 is selectively connected to the mobile resources 110, 120 and 130 via a network switch structure 154, such as a mobile switching center (MSC) or service control point (SCP), cell site equipment 152 and an air interface. Although the cell site equipment 152 is illustrated as a single antenna, it will be appreciated that the wireless network will generally include many cell sites. In addition, each cell site may include multiple antennas, e.g., each covering a sector of the associated cell.

The illustrated server 170 communicates with the wireless network platform 160 via the Internet 180 in the illustrated embodiment. In addition, depending on the nature of the client platform 140, including whether the platform 140 is a wireless or wireline platform, the server 170 may communicate with the client platform 140 directly via the Internet 180 or via the Internet 180 and wireless network components.

A variety of different kinds of mobile resources 110, 120, and 130 may be monitored in accordance with the present invention. In this regard, for various vehicle monitoring applications, vehicles may be monitored based on GPS equipment or radio units such as wireless telephones associated with the vehicle. For other applications, movement of an individual may be monitored based on locating the user's wireless telephone or other wireless terminal. As will be discussed in more detail below, in such cases, the mobile resource 110, 120 or 130 may be located, at least in part, based on radio signals transmitted by the wireless terminal.

Depending on the nature of the mobile resource 110, 120 or 130, the processing and display capabilities may vary. For example, in the case of a vehicle with an onboard computer and high resolution monitor, a full range of processing and display capabilities may be available. By contrast, where the mobile resource 110, 120 or 130 is a PDA or wireless telephone, the processing and display capabilities may be quite limited. In addition, processing of graphical location information may be bandwidth limited. For example, in the case of a laptop computer interconnected to a wireless network via a CDPD phone/modem, the graphics and processing capabilities may be significant, but the available bandwidth may limit the graphical display information that is available at a given time or within a given time period.

The wireless network platform 160, which may be located proximate to the switch 154, includes a processor 162 for running applications 164 and 166 and accessing databases 167–169. The mobile resource database 167 may include various kinds of information regarding the mobile resources of the network. Such information may be indexed against a mobile resource identifier such as an MIN/ESN. For example, the stored information may relate to a subscriber service plan, subscriber rating zones such as a home zone of the subscriber where the subscriber pays reduced calling rates, or subscriber preferences regarding lodging, restaurants or other services.

The network topology database 168 stores information regarding a current topology or configuration of the network. In this regard, it will be appreciated that network topology changes from time to time, for example, as new cell site equipment is added to meet demand or enhance network coverage. As will be understood from the description below, such network topology including, for example, the coverage areas of specific cell sector antennas may be useful in obtaining location information regarding a mobile resource.

The location cache 169 stores recent location information regarding monitored mobile resources. Depending upon the nature of the location finding equipment involved, such location information may be based on a cell or cell sector location of the mobile resource, or may include more accurate coordinate information such as from GPS, network assisted GPS or network triangulation technologies. Preferably, the location information is stored in a standard format defining, for example, location coordinates and an uncertainty radius. Thus, in the case of a cell sector location, the location may be stored in the location cache 169 as a center point or other reference coordinates for the cell sector and an uncertainty radius. It will be appreciated that the location information need not be stored as coordinates and a circular uncertainty region, but rather, areas of other shapes including complex and discontinuous areas may be supported.

The location manager 166 is operative for performing a number of functions relative to managing location information for various mobile resources and associated location applications. Thus, for example, the location manager may receive raw or processed location information from an LFE 150, express the location information in a standard format and store the information in the location cache 169. In addition, the location manager 166 may receive location requests from specific applications, for example, a fleet management application, and obtain responsive location information if available. Thus, the application may specify the mobile resource or resources of interest, the required or desired accuracy of the location data, and the timeliness of the location data. Based on this request, the location manager 166 can access the location cache 169 to determine whether any suitable location information is available for the identified mobile resources and, if not, may invoke an LFE 150 to obtain appropriate location information. A number of other potential functions of the location manager 166 are described in copending U.S. patent application Ser. No. 09/396,235 which is incorporated herein by reference.

The illustrated wireless network platform 160 also includes a data communications module 164. The data communications module 164 is operative for facilitating data communication as between the Internet 180 and a wireless network. A number of technologies and protocols are available for this purpose. For example, CDPD systems use available bandwidth of a wireless network to communicate data packets. Thus, in the case of CDPD systems, the data communications module 164 is operative for handling communications between the mobile resources 110, 120 and 130 on the one hand, and Internet sites on the other, in accordance with the CDPD protocol. It will be appreciated that the nature and functionality of the data communications module 164 may vary depending on the operating environment.

In the illustrated embodiment, the location finding equipment for providing location information regarding mobile resources of interest is generally indicated by box 150. It will be appreciated that the nature of the location information provided, including its accuracy and the pathway for transmitting the information, will depend on the location technology employed. In the case of fully integrated GPS systems associated with the mobile resources 110 120 and 130, the location information may be computed at the mobile resource 110, 120 or 130 and then transmitted to the wireless network platform 160 via the cell site equipment 152 and switch 154. From the wireless network platform 160, the information may in turn be transmitted to the server 170 and/or the client platform 140 via the Internet 180. Similarly, for a variety of other location finding technologies associated with the wireless network, including AOA, TDOA, network assisted GPS, cell, cell sector, and microcell technologies, the location information may be transmitted to the wireless network platform and then to the server 170 or client platform 140 via the Internet 180. Alternatively, the location information may be transmitted from the LFE 150 to the network server 170 or client 140 directly or via the Internet 180. In addition, for fully integrated GPS systems associated with the mobile resources 110, 120 and 130, the location information may alternatively be retained at the mobile resource and subsequently combined with mapping information transmitted from the server, thereby eliminating the need to transmit mobile resource marker information from the server 170 to the client platform 140.

As noted above, the client platform 140 may be associated with a mobile resource, e.g., 130, or may be remotely located. The illustrated client platform 140 includes a computing unit 142 that is associated with mobile resource 130. The computing unit 142 generally includes a processor 144 running at least a mapping application 148 and a browser application 146, a display 147 and a data communications module 149. In the case of a wireless platform, the data communications module 149 can function as a mirror image of the data communications module 164 of the wireless network platform 160. Thus, as described above, the data communications module 149 may be operative for handling RF data communications across an air interface in accordance with the CDPD or other protocol.

The display 147 displays mapping information and mobile resource marker information as will be described in more detail below. It will be appreciated that the display 147 may vary from a high resolution monitor to a very limited graphical display, e.g., associated with a wireless telephone, depending on the application. In the illustrated embodiment, mapped images are generated locally on the client platform 140. In this regard, the mapping application 148 may be, for example, a Microsoft Windows application that communicates to the server 170 for mapping data and associated marker data. The application 148 reads the mapping data provided by the server 170, e.g., local map vector data, and produces the specified map image. This map image is displayed on the display 147. Any relevant mobile resource locations are then plotted in conjunction with this map at the computed position, as determined by the mapping application 148.

The browser application 146 may be a conventional browser or microbrowser depending on the nature of the client platform 140. The illustrated application 146 runs a java applet that allows users logging into the server site 170 to view graphical position data regarding the mobile resources 110, 120 and 130. Specifically, the applet requests a map image from the server 170. The server 170 finds the appropriate vector data to generate the image, generates the bit map image, and passes this to the applet. The applet permits the user to zoom in or out as well as pan, as will be illustrated below. These map operations cause subsequent requests to the map server 170 for additional map images. At a predefined poll time, upon request, or as otherwise triggered, the applet requests the current resource positions from the server 170. These positions generally contain the latitude/longitude position coordinates along with the unit ID and, if available, the unit heading, speed and a time stamp. Upon receiving these positions, or whenever the map is changed, the applet determines where on screen (if at all) the mobile resources should be drawn.

The applet may also be used to make historical position requests, to send messages to mobile resources in packets with data heads, access stored position information and trigger location based events such as generating an email or other message when a mobile resource traverses a specified boundary or when the mobile resource receives a specified signal.

The illustrated server 170 includes a processor 172 for accessing a mapping database 174 and running an interface module 176 including metaprotocol logic 178 and protocol logic 179. The mapping database 174 stores vector information for generating maps. A variety of commercial products are available for this purpose including the MAPS product marketed by Signal Soft Corporation. In this regard, the processor 172 may access and transmit particular mapping information based on an instruction from the client platform 140 or based on the location of one or more mobile resources 110, 120 and 130. Thus, for certain applications, a user may request the display of a map for a particular area together with any mobile resources that may be located within that area. In other applications, the user may request that the display follow a particular mobile resource. In such a case, the processor 172 may retrieve mapping information for a surrounding area based on received location information for the mobile resource. Although not shown, the server 170 may also include a historical database for storing location information for one or more mobile resources. In this manner, a user may be provided with trailing information showing a recent travel path of the mobile resource or historical data showing the travel path of a mobile resource over a selected period of time. Similarly, for applications such as the billing history application noted above, location information may be stored over a significant period of time.

In the illustrated embodiment, the server 170 also includes an interface module 176. The illustrated interface module 176 allows the server to work in a variety of operating environments such as environments involving different location finding systems, different protocols and different platforms employing different messaging sets. In this regard, the interface module includes metaprotocol logic 178 and protocol logic 179. The metaprotocol logic handles communications using generic messaging sets and a generic protocol. That is, within the metaprotocol logic 178 communications do not necessarily conform to any particular industry protocol, but communications are handled according to rules that generally correspond to those of various protocol systems. The protocol logic 179 is operative to translate as between the generic message sets and generic protocol of the metaprotocol logic layer 178 and the various external industry protocols. In this regard, the server 170 is enabled to interface with satellite or network based LFEs, and can communicate in accordance with CDPD protocol, as well as UDP and IP protocols. The server 170 thus provides a common platform for supporting services in various operating environments.

Figure 2:
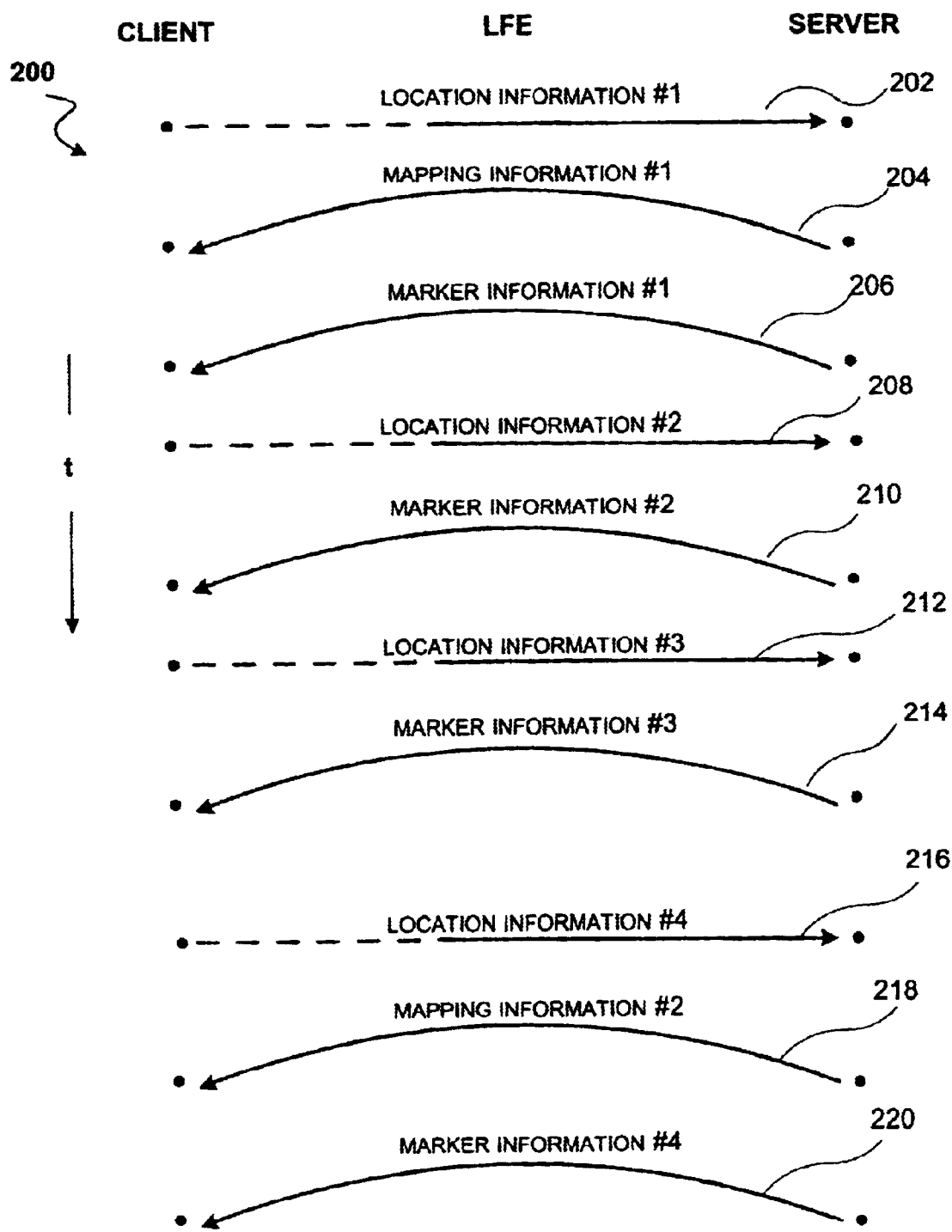
FIG. 2 is a diagram illustrating a messaging sequence of the graphical location information system of FIG. 1.

In accordance with the present invention, the mapping information and mobile resource location information are preferably transmitted from the server to the client in separate message sets or are otherwise combined at the client to generate a display including the mapping information and marker information identifying the mobile resource location. FIG. 2 illustrates a messaging sequence where the location information and mapping information are transmitted from a server to a client in separate message sets. The illustrated messaging sequence 200 is initiated by transmitting location information to the server. Depending on the nature of the location finding technology employed, the location information may be transmitted from the client e.g., in the case of a fully integrated GPS system, or from a separate LFE. Based on this location information, the server transmits to the client a first message set 204 including first mapping information and a second message set 206 including first marker information. As will be described in more detail below, the marker information includes information sufficient to define a graphical representation of the mobile resource location. Such information may simply include coordinates which may be represented by a cursor, crosshairs, a point or other identifier, or the location information may include coordinates with an uncertainty radius or other defined uncertainty region. The location information may further include bearing and speed information depending on the nature of the location finding technology involved. As noted above, in connection with certain types of location finding systems, such information may be retained at the client or transmitted directly from the location finding equipment to the client rather than being transmitted to the client via the server.

The message set 208 of the illustrated embodiment includes additional mobile resource location information. For example, the message set 208 may include updated location information for the same mobile resource. As noted above, a particular application may be designed to track a mobile resource by obtaining updated location information at predetermined time intervals. Thus, the application may invoke an LFE to obtain updated information for an identified mobile resource every fifteen seconds or at some other regular interval. Alternatively, the location information may be updated on demand or in response to other events such as crossing a defined boundary. Alternatively, the second message set may include location information for a different mobile resource. In response to the message set 208 including the second location information, the server transmits a message set 210 including second marker information. It should be noted that in the illustrated implementation, the server does not necessarily send additional mapping information in response to the new location information. In particular, it may not be necessary to send new mapping information if the second marker can be displayed together with the original mapping information. Indeed, as shown in FIG. 2, a series of additional message sets 212 and 214, including new location information and corresponding marker information may be transmitted without requiring downloading of additional mapping information. In this manner, the total amount of information transmitted as between the server and client can be significantly reduced as may be particularly advantageous for bandwidth limited environments such as wireless client platform environments. It will be appreciated that this advantage can be achieved because the marker information and mapping information are transmitted in separate message sets for correlated combination at the client platform, as opposed to embedded location map servers where the marker information is combined with the mapping information prior to transmission across the network interface.

In the illustrated implementation, second mapping information is transmitted in message set 218. The need for additional mapping information may be triggered by a variety of events. For example, a mobile resource that is being tracked may travel outside of the boundaries of the previously transmitted mapping information. Alternatively, a user may request a different map view. Additional mapping information may also be required if the user requests graphical location information regarding a mobile resource that cannot be displayed on the previously transmitted map image. At or near the time that this second mapping information is transmitted, a further message set 220 including current marker information for one or more mobile resources of interest may be transmitted. This marker information and the second mapping information can then be combined at the client to provide a composite display showing at least one mobile resource location on the map image.

Figure 3:
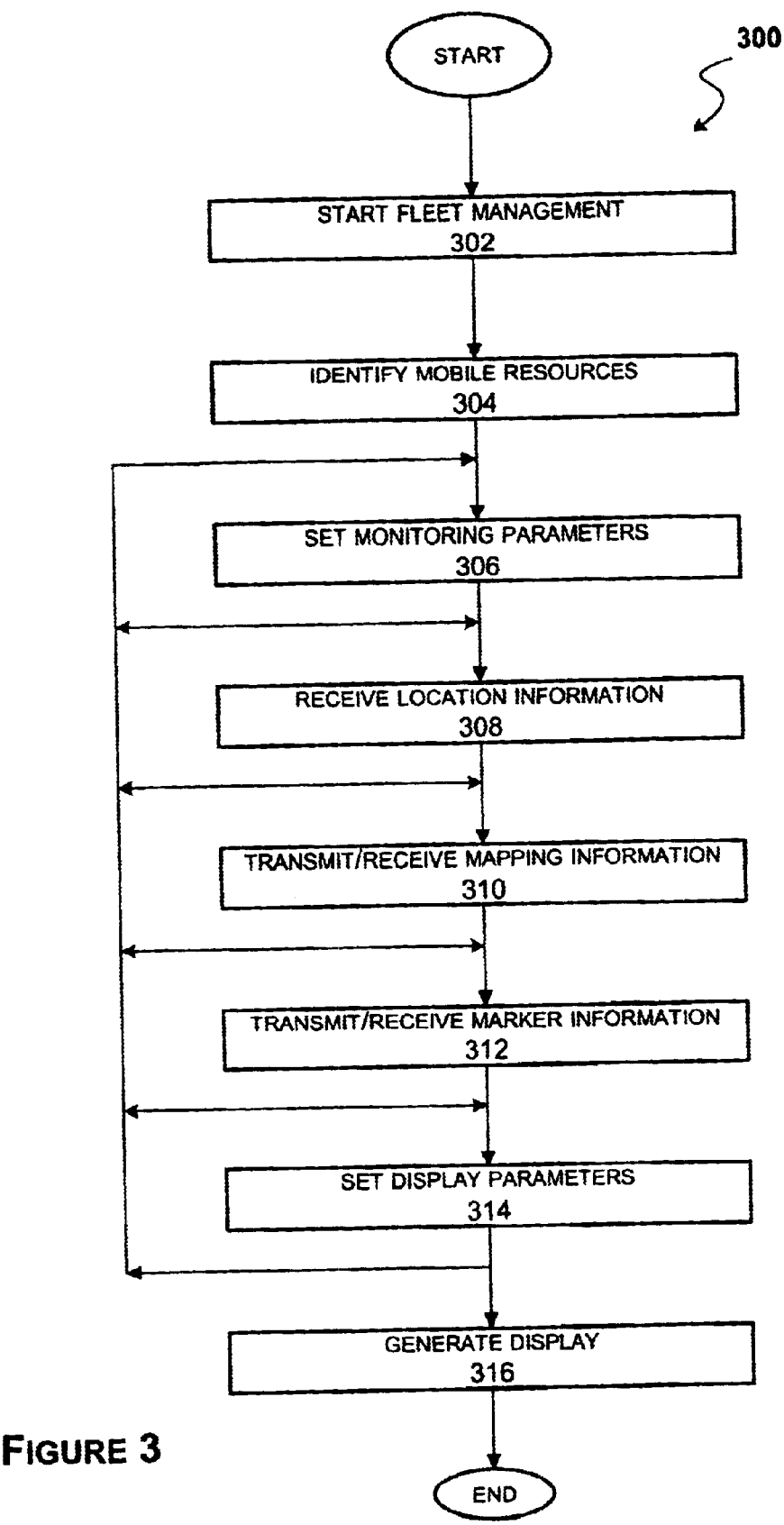
FIG. 3 is a flowchart illustrating a process implemented by the graphical location information system of FIG. 1.

FIG. 3 is a flowchart of a process 300 in accordance with the present invention. The illustrated process 300 is initiated by loading or otherwise starting (302) a graphical information application, in this case, a fleet management application. The user can then identify (304) the mobile resources of interest. For example, the user may desire to view the location of all mobile resources of a fleet or only specified resources. Alternatively, the fleet manager may wish to identify the mobile resource closest to a location of interest or all mobile resources within a particular area.

In addition, the user may set (306) various monitoring parameters for the fleet management program. Such monitoring parameters may include a polling frequency for updating the locations of mobile resources of interest, or specify other update triggering events such as the crossing of a specified boundary by a mobile resource. Based on these parameters, the server will receive (308) location information for the identified resources. In response, the server can access and transmit (310) mapping information which in turn is received by the client. In addition, the server transmits (312) marker information based on the received location information and this information is, in turn, received by the client. As illustrated, the user may change the identified resources and reset the monitoring parameters from time to time. In addition, the server may receive location information, transmit mapping information and transmit marker information from time to time during operation.

In the illustrated process 300, the user can also set various display parameters. For example, the user may identify the boundaries of the desired map image. The user may also zoom in, zoom out or pan across a geographical area. In addition, the user may request that a unit be made visible or invisible, may request that the unit be shown with trails indicating recent movement or request a history showing movement over a period of time. Also, the user may request that the location information be displayed with an indication of any uncertainty and an indication of the timeliness of the information. Based on the received mapping information, marker information and displayed parameters, the client can then generate (316) a display presenting the desired graphical location information.

Figure 4:
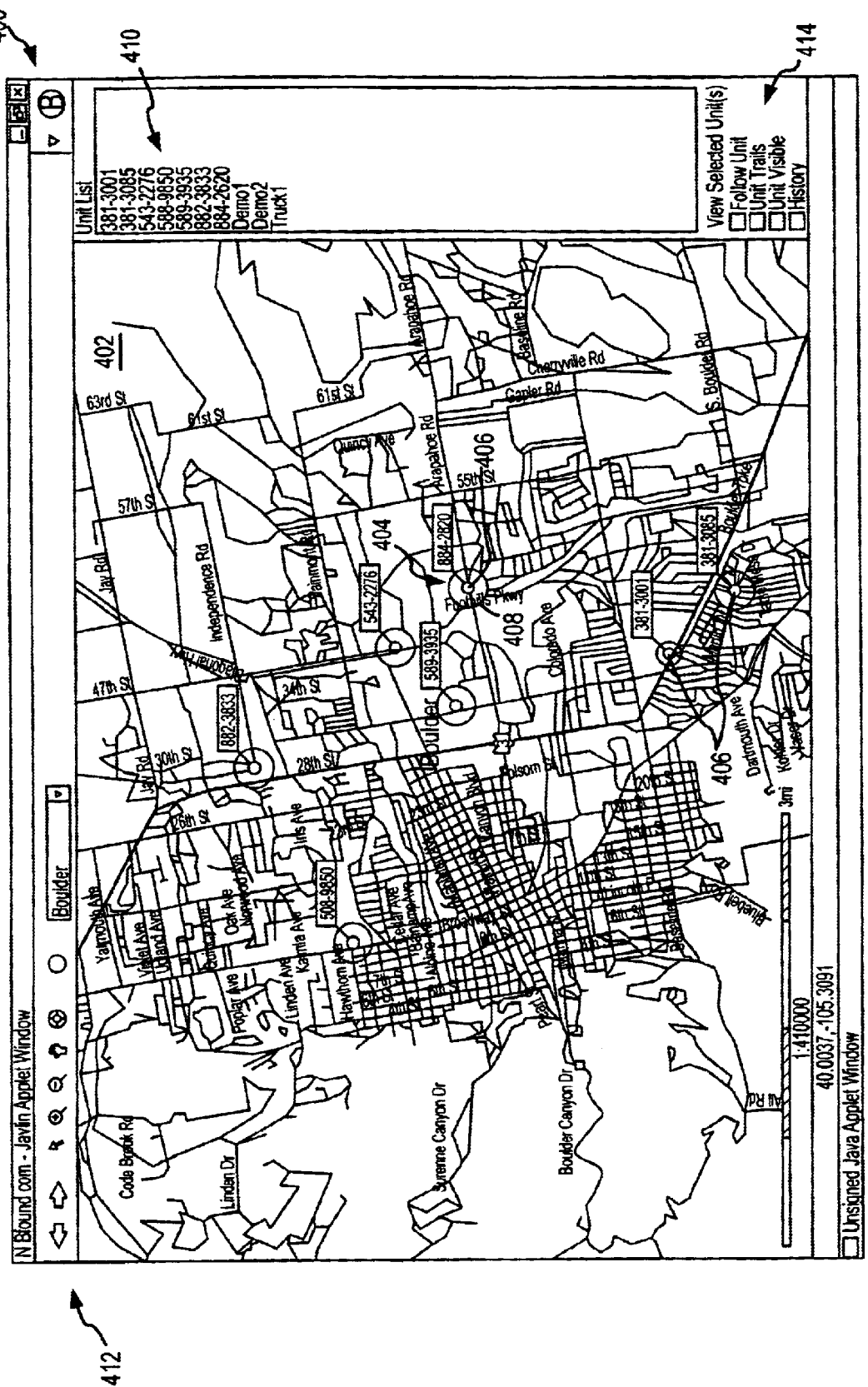
FIG. 4 illustrates a graphical location information display generated by the graphical location information system of FIG. 1.

FIG. 4 illustrates a display 400 including graphical location information for a fleet management application. The display 400 shows the location of various mobile resources 406 superimposed on or otherwise shown in conjunction with mapping information 402. A unit list 410 identifies the mobile resources for which information is desired. In this case, the mobile resources are indicated by phone numbers of the tracked wireless units. It will be appreciated, however, that the mobile units may alternatively be identified by names or other identifiers. The location of each mobile resource that is located within the displayed map image is identified by a location marker 406 and an uncertainty boundary 408, in this case, a circular uncertainty radius around the location marker 406. It should be noted that different uncertainties may be associated with the locations of different mobile resources. For example, this may occur where certain resources are located by location finding systems having different accuracies. In this regard, a GPS transceiver generally has greater accuracy than, for example, a cell sector location system. In FIG. 4, it will be noted that the uncertainty area associated with the resource 381–3001 is significantly less than the uncertainty associated with, for example, unit 381–3085.

The illustrated display shows a number of other features. In this regard, toolbar 412 allows the user to select from a number of display options. These options include moving to a previous map or the next map, selecting device properties such as position, speed and heading, zooming in or zooming out, panning across the map, or centering the map relative to a selected location. In addition, the illustrated embodiment, an icon may be provided to allow the user to send a message to selected mobile resources, e.g., via email or the like. A map layers icon brings up a list of feature layers which can be displayed on the map. Finally, in the illustrated embodiment, a pull down screen is provided for storing map bookmarks linked to map images to which a user may wish to return. It will be appreciated that, by storing a number of commonly used map images, the response time of the application can be substantially improved, particularly for bandwidth limited environments.

The illustrated display also provides check boxes 414 for selecting various viewing operations. Thus, for example, by highlighting a particular unit from the unit list and checking the "follow" box, the displayed image can be made to track movement of the identified unit. If the "unit trails" box is checked, trails will be provided for each identified unit to show recent movement and thereby provide an indication of travel direction. The "unit visible" box allows the user to toggle between visible and invisible for an identified unit thereby selectively eliminating a unit from the display. Finally, the "history" box allows the user to review a history of movement for selected units. Thus, for example, the user may see where a unit has traveled during the last twenty-four hours or during the term of a rental contract. In addition, the display may include timeliness information in connection with the displayed mobile resource location information. For example, the unit location may be displayed in one color if the information is less than fifteen minutes old and in another color if the information is older.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A method for use in providing location information regarding mobile resources in a data enabled network, comprising the steps of:

providing a server node associated with at least one wireless communication network assisted location finding system;

said server node being in selective communication with a client node via the data enabled network;

receiving, at the server node, network location information regarding a mobile resource location, said network location information being obtained using said at least one network assisted location finding system, wherein said network location information is based on the location of said mobile resource in relation to at least one fixed ground-based wireless network structure having a known geographic location;

accessing at the server node, geographical mapping information for an area including said mobile resource location;

processing said network location information regarding said mobile resource location, at said server node, to generate marker information defining a graphical representation of said mobile resource location, wherein said marker information represents said network location information so as to permit graphical combination of said marker information with said mapping information;

first transmitting in a first message set, said mapping information from said server node to said client node;

second transmitting in a second message set, said marker information from said server node to said client node; and wherein said mapping information and said marker information can be combined at said client node to generate a graphical display indicating said mobile resource location.

2. The method as claimed in claim 1, wherein said step of receiving comprises obtaining first information relating to a geographical location of said mobile resource and second information regarding uncertainty with respect to said geographic location.

3. The method as claimed in claim 1, wherein said step of receiving comprises determining said network location information at least partially based on a triangulation method wherein a plurality ground-based wireless communication network structures having known locations are utilized to determine said network location information.

4. The method as claimed in claim 1, further comprising successively transmitting marker information representing locations of said mobile resource at successive times for combination at said client node with said mapping information of said first message set.

5. The method as claimed in claim 4, wherein said locations are all within said area.

* * * * *